United States Patent [19]
Peterman et al.

[11] 3,825,844
[45] July 23, 1974

[54] SYSTEM FOR RECOVERING PHASE SHIFTED DATA PULSES

[75] Inventors: Neil R. Peterman, Orange; Darryl K. Korn, Laguna Beach, both of Calif.; Stephen Millard, Phoenix, Ariz.

[73] Assignee: Peripherals General, Inc., Cherry Hill, N.J.

[22] Filed: Oct. 18, 1972

[21] Appl. No.: 298,741

[52] U.S. Cl. .................. 329/104, 325/346, 328/109, 328/63, 329/50, 329/122, 331/23
[51] Int. Cl. .............................................. H03d 3/18
[58] Field of Search ........ 329/50, 104, 122; 331/23, 331/25; 328/109, 110, 63; 325/346, 419

[56] References Cited

UNITED STATES PATENTS

| | | | |
|---|---|---|---|
| 3,518,554 | 6/1970 | Gabor | 328/63 |
| 3,525,945 | 8/1970 | Puente | 329/122 X |
| 3,594,651 | 7/1971 | Wolejsza | 329/104 |
| 3,602,828 | 8/1971 | Kurzweil et al. | 329/104 |
| 3,683,288 | 8/1972 | Curry | 329/104 |
| 3,684,967 | 8/1972 | Kelly | 328/63 |

*Primary Examiner*—Alfred L. Brody
*Attorney, Agent, or Firm*—Seidel, Gonda & Goldhammar

[57] ABSTRACT

Apparatus for recovering data from a signal having data bits interleaved between clock pulses wherein the data pulses, clock pulses or both may be shifted. The signal from which data is to be recovered is applied to a phase locked oscillator. The phase locked oscillator produces a free running center frequency output signal having a frequency of twice the clock frequency. The frequency of the phase locked oscillator is varied in response to the shift in the pulses in the incoming signal. Data and clock time window signals are generated in response to the varying output frequency of the phase locked oscillator. The incoming signal is gated by a first and a second gating means during the data and clock time window signals, respectively. The signal may be delayed before being gated in order to insure sufficient time for the generation of the data and clock time window signals.

7 Claims, 3 Drawing Figures

SYSTEM FOR RECOVERING PHASE SHIFTED DATA PULSES

This invention relates to a data recovery system. More particularly, this invention relates to a data recovery system in which a data signal may be recovered from a signal having data bits interleaved between clock pulses even though a shift in the pulses may have occurred.

The present invention enables detection of data from a double frequency encoded data signal even though shifting of the pulses in the signal may have occurred. The shifting of the pulses in a signal may occur in a data information system for various reasons. The relative pulse positions may be shifted due to recording and reproduction on a magnetic media. Shifts may occur due to imperfections in data transfer equipment, such as for example, between various input/output equipment and the main frame of a computer. Similarly, the pulse positions of the pulses in a double frequency encoded data signal may be shifted by buffers or other storage devices.

In accordance with the present invention, a double frequency encoded signal, that is a composite signal having data bits interleaved between clock pulses, may be decoded by generating data and clock time window signals which are shifted in accordance with the pulse shift of the signal. Briefly, the double frequency encoded data signal or signals are applied to a phase locked oscillator which produces an output signal having a center or free running frequency of twice the frequency of the clock signal. The phase locked oscillator varies the frequency of its output signal in response to variations or shifts in the pulse positions of the signal. The output of the phase locked oscillator is applied to a data and clock time window generating signal means. The data and clock time window signal generating means uses alternate pulses to trigger single shots which produce a data time window signal and a clock time window signal. The data time window signal and clock time window signal are applied to a pair of gating means which gate the data and clock signals, respectively. A delay circuit may be provided to delay the signal before it is applied to the gating means to ensure sufficient time for the generation of the data and clock time window signals.

For the purpose of illustrating the invention, there are shown in the drawings forms which are presently preferred; it being understood, however, that this invention is not limited to the precise arrangements and instrumentalities shown.

Figure 1:
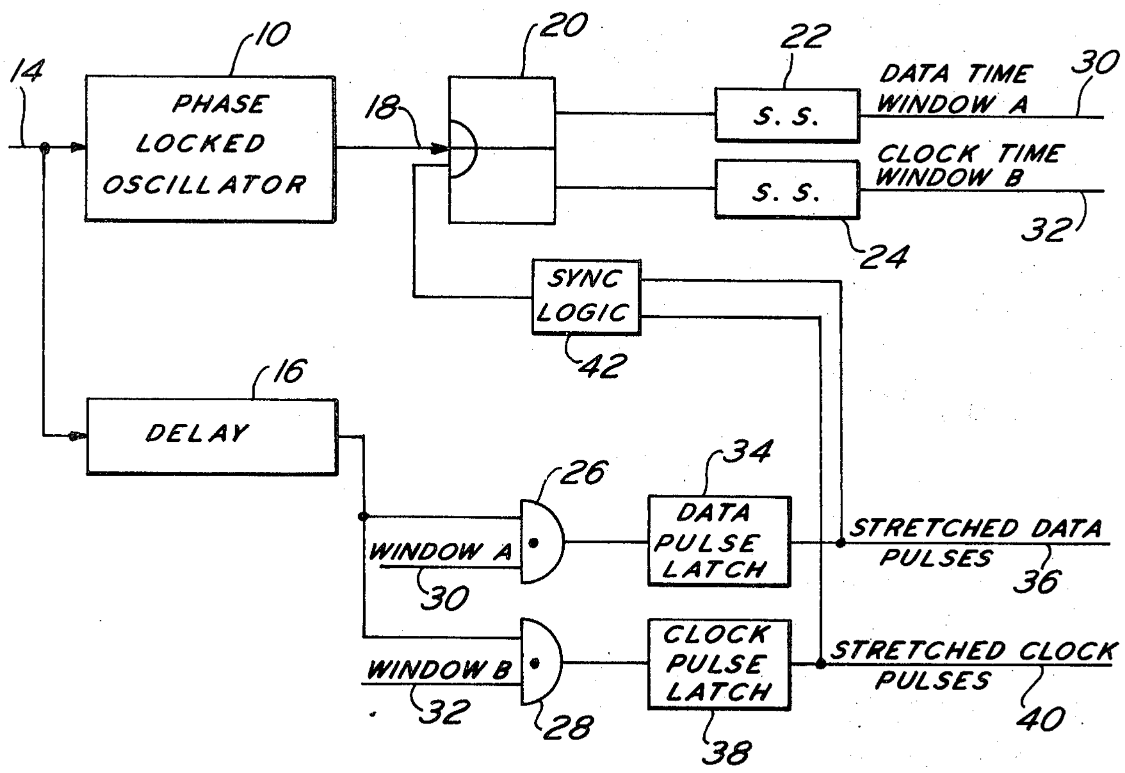
FIG. 1 is a schematic diagram, in block diagram form, of an apparatus in accordance with the present invention.
Figure 3:
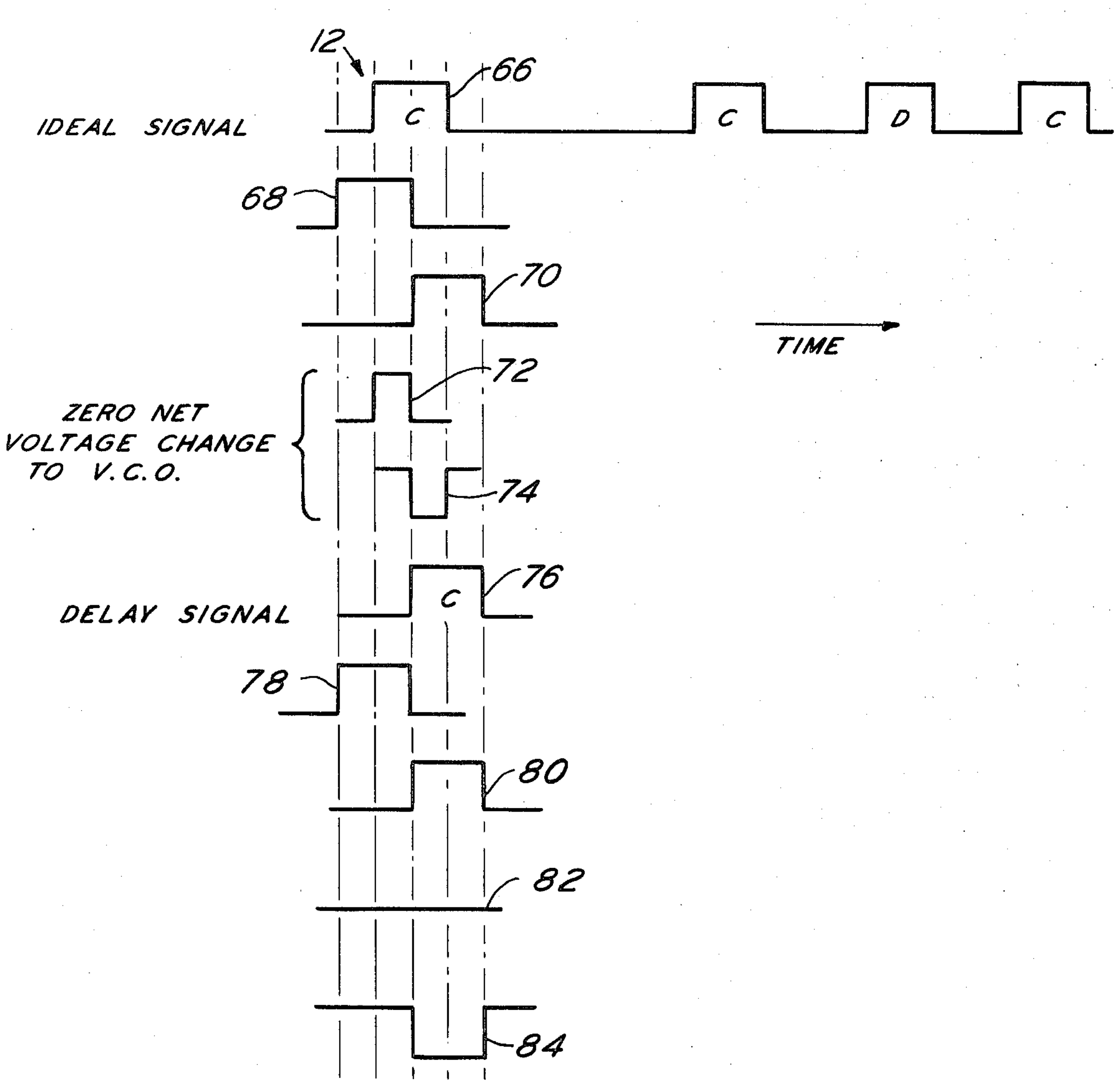
FIG. 3 is a drawing of signal wave forms generated in practicing the present invention.

Referring now to the drawings in detail, there is shown in FIG. 1 a phase locked oscillator 10 which receives a double frequency encoded data signal or signal 12 on line 14 as shown in FIG. 3. The signal 12 on line 14 is also fed to delay circuit or network 16.

Phase locked oscillator 10 produces a free running or center frequency output signal having a frequency of twice the frequency of the clock pulses in signal 12. That is, the phase locked oscillator 10 would have an output frequency equal to the frequency of pulses occurring in an ideal signal 12 in which every data bit was a "1." The output frequency of phase locked oscillator 10 is varied in response to variations or shifts in the pulse positions of the input signal 12. That is, if a particular input pulse is shifted back in time or delayed, the frequency of the output signal of phase locked oscillator 10 is decreased slightly. If the pulse position of an input pulse is advanced, the frequency of the output signal of phase locked oscillator 10 is increased.

The output of phase locked oscillator 10 is applied to the toggle input 18 of toggle flip-flop 20. Toggle flip-flop 20 provides a triggering pulse to single shots 22 and 24 on alternate pulses applied to toggle input 18. Single shot circuits such as single shots 22 and 24 are conventional and well known. A single shot circuit produces a pulse of a fixed or predetermined pulse width upon being triggered. The output of single shot 22 is a pulse of a fixed pulse width which is referred to herein as the data time window signal. The output of single shot 24 is similarly a pulse of a fixed pulse width which is referred to herein as a clock time window signal. The data time window signal and clock time window signals are so-called time windows or periods of time during which a signal may be recovered or detected. If the signal which is desired to be detected occurs outside of the time period or window, the signal will not be detected.

The output of delay circuit 16 is fed to AND gates 26 and 28. Data time window signal from single shot 22 is applied to input 30 of AND gate 26. The clock time window signal from single shot 24 is applied to input 32 of AND gate 28. When a pulse appears on the output of delay circuit 16 during the presence of the data time window signal on input 30, AND gate 26 produces an output which triggers data pulse latch circuit 34. Upon being triggered by the output of AND gate 26, data pulse latch circuit 34 produces a stretched data pulse output or in other words a data pulse having an expanded pulse width or time duration. The data pulses on line 36 are the recovered data pulses from signal 12 on line 14.

When a pulse signal occurs on the output of delay circuit 16 and a clock time window signal appears on input 32 of AND gate 28, an output pulse is generated on the output of AND gate 28 which triggers clock pulse latch circuit 38. The output of clock pulse latch circuit 38 is a stretched clock pulse or a pulse having an extended duration or pulse width similar to the output of data pulse latch circuit 34. The clock pulses appearing on line 40 are the recovered clock pulses from signal 12 on line 14.

Sync logic unit 42 detects a sync signal in the signal on line 14. Sync logic 42 ensures that data pulses appear on line 36 and clock pulses appear on line 40. If clock pulses appear on line 36 and data pulses appear on line 40, sync logic 42 causes toggle flip-flop 20 to skip or be unresponsive to one of the pulses on toggle input 18. This causes a shift in the timing of signals applied to single shots 22 and 24. One example of a sync signal which may be detected by sync logic 42 is a predetermined number of clock pulses with all of the data bits between the clock pulses being "0's." For example, a series of 50 clock pulses without any data pulses or data "1's" therebetween could be a suitable sync signal.

Figure 2:
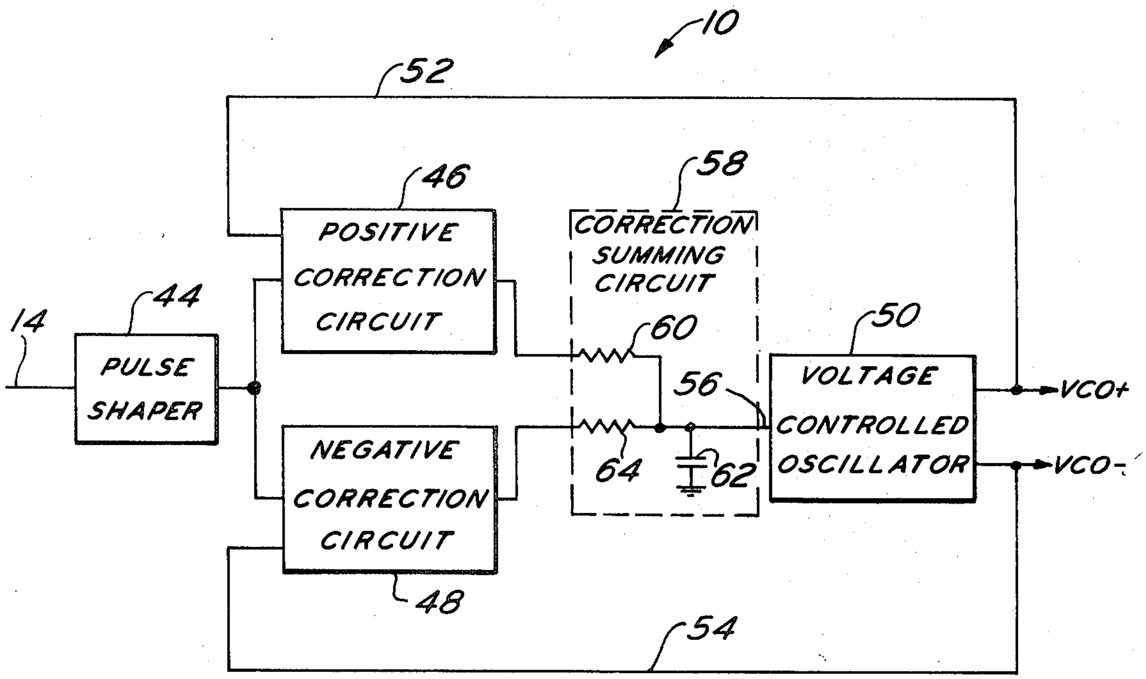
FIG. 2 is a schematic diagram, partially in block diagram form, of a phase locked oscillator in accordance with the present invention.

Referring now to FIG. 2 in conjunction with FIG. 3, there is shown a schematic diagram, partially in block diagram form, of a phase locked oscillator 10 which may be used in FIG. 1. The double frequency encoded data signal or signal on line 14 is fed to pulse shaper circuit 44. The output of pulse shaper circuit 44 is fed to positive correction circuit 46 and negative correction circuit 48. Positive correction circuit 46 receives a second input from one of the outputs of voltage controlled oscillator 50 via line 52. Negative correction circuit 48 receives a second output from voltage controlled oscillator 50 via line 54. Voltage controlled oscillator 50, with no voltage applied to its input 56, provides free running square wave output signals on lines 52 and 54 having a frequency of twice the input clock pulses without any pulse shifting. That is, voltage controlled oscillator 50 provides square wave outputs on lines 52 and 54 of opposite polarity and at a frequency of twice the ideal clock rate frequency.

Positive correction circuit 46 provides a positive output signal to summing circuit 58 during the period of time that there an input pulse present on both of its input terminals. Negative correction circuit 48 provides a negative output signal to summing circuit 58 during the period of time that there are pulses present on both of its input terminals. The output of positive correction circuit 46 is fed through resistor 60 to capacitor 62. The output of negative correction circuit 48 is fed through resistors 64 to capacitor 62. Since the output of positive correction circuit 46 is positive and the output of negative correction circuit 48 is negative, outputs of equal duration from positive correction circuit 46 and negative correction circuit 48 will produce a zero net effect on input 56 of voltage controlled oscillator 50.

Under ideal conditions, that is without any pulse shifting, the transition times of the square wave output of voltage controlled oscillator 50 occur at the mid point of the pulse width of the clock and data pulses appearing at the output of pulse shaper circuit 44. Under these ideal conditions, equal duration positive and negative signals will be fed to summing circuit 58 from positive correction circuit 46 and negative correction circuit 48, respectively. A clearer understanding of this may be seen by reference to FIG. 3 in conjunction with FIG. 2. An ideal clock pulse or a clock pulse that is not shifted with respect to time is shown at 66. Under these ideal conditions, the output of voltage controlled oscillator 50 on line 52 is shown at 68 and the output on line 54 is shown at 70. Under these conditions, the output of positive correction circuit 46 is shown at 72 and the output of negative correction circuit 48 is shown at 74. The net effect of the pulses shown at 72 and 74 in summing circuit 58 is a "0" voltage change on input 56 to voltage controlled oscillator 50.

A delayed clock pulse is shown in FIG. 3 at 76. The output of voltage controlled oscillator 50 on line 52, before correction, is shown at 78. The output of voltage controlled oscillator 50 on line 54 is shown at 80. Since the clock pulse shown at 76 from pulse shaper 44 and the square wave output pulse on line 52 from voltage controlled oscillator 50 do not occur simultaneously, no output will be generated by a positive correction circuit 46. This is shown at 82 in FIG. 3. However, the clock pulse 76 and the output pulse of voltage controlled oscillator 50 on line 54 overlap for the entire duration of clock pulse 76. Therefore, negative correction circuit 48 will generate an output pulse to summing circuit 58 as shown at 84. Negative pulse 84 will charge capacitor 62 negatively. The negative charge on capacitor 62 will be applied to input 56 of voltage controlled oscillator 50 which will cause a decrease in the frequency of the square wave output of voltage controlled oscillator 50. One of the square wave outputs of voltage controlled oscillator 50 is provided to the toggle input of toggle flip-flop 20 in FIG. 1. Therefore, the decrease in frequency of voltage controlled oscillator 50 causes the time window to be delayed. In the case of a clock pulse, the clock time window signal output from single shot 24 will be delayed. The delaying of the clock time window signal therefore enables the clock pulse to be recovered even though there has been a pulse shift or time delay in the appearance of the clock pulse on line 14. Similarly, if a clock or data pulse were to appear earlier in time, the corresponding time window would be advanced.

In summary, in operation, a double frequency encoded data signal is applied to line 14 in FIG. 1. The phase locked oscillator 10 generates a frequency output signal as described with respect to FIG. 2. That is the phase locked oscillator 10 generates a frequency output signal which varies about a frequency equal to twice the clock frequency. The phase locked oscillator frequency output increases slightly above twice the clock frequency when the input pulses are advanced or shifted ahead. The output frequency of phase locked oscillator 10 decreases slightly when the input pulses are delayed or shifted back in time.

The output of phase locked oscillator 10 is applied to toggle input 18 of flip-flop 20 which basically divides the output of phase locked oscillator into two frequency signals which are delayed or advanced in response to the pulses in the input signal being shifted. If the output frequency of phase locked oscillator 10 is increased, the time window signals out of single shots 22 and 24 are advanced in time. If the frequency output of phase locked oscillator 10 is decreased, the time window signals from single shots 22 and 24 are delayed in time. The time window signals which may be advanced, delayed or unchanged depending upon the input signal, are applied to AND gates 26 and 28. The time window signals are used to gate the delayed signal output of delay circuit 16. In summary, the time window signals are shifted in accordance with the time shift of the incoming pulses themselves, thereby producing data and clock pulses in the proper channels even though there may be significant pulse shifting. In present day data information technology, pulse shifts of 50 to 100 nanoseconds may be significant and may cause a clock pulse to be placed in a data pulse channel or vice versa. Sync logic unit 42 insures proper synchronization as discussed above, especially upon the initiation of operation.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for recovering data from a composite signal having data bits comprised of pulses and zeros interleaved between clock pulses occurring at a predetermined frequency, comprising:

a phase locked oscillator including a voltage controlled oscillator having a free running frequency of twice said predetermined frequency, means for comparing the output of said voltage controlled oscillator with said composite signal and means responsive to said comparison means for increasing the frequency of said voltage controlled oscillator whenever a pulse of said composite signal is advanced in time and for decreasing the frequency of said voltage controlled oscillator whenever a pulse of said composite signal is delayed in time;

means for generating a data time window signal and a clock time window signal in response to the output signal of said voltage controlled oscillator;

first gating means, said first gating means gating said composite signal in response to said data time window signal to produce a data output signal; and second gating means, said second gating means gating said composite signal in response to said clock time window signal to produce a clock output signal.

2. Apparatus in accordance with claim 1 wherein said comparison means comprises a first circuit means, a second circuit means, and a summing circuit for summing the outputs of said first and second circuit means, and wherein said voltage controlled oscillator produces a square wave and a phase inverted square wave having free running frequencies of twice said predetermined frequency, said first circuit means producing a first polarity output to said summing circuit in response to detecting a pulse of said composite signal and a pulse of said square wave, said second circuit means producing a second polarity output opposite to that of said first polarity in response to detecting a pulse of said composite signal and a pulse of said inverted square wave.

3. Apparatus in accordance with claim 2 wherein said phase locked oscillator includes a pulse shaping circuit for shaping the pulses in said composite signal before applying them to said first and second circuit means.

4. Apparatus in accordance with claim 1 wherein said means for generating the data and clock time window signals includes a toggle flip-flop for generating two pulse signal outputs at frequencies equal to half of the frequency output of said voltage controlled oscillator, and a first and a second single shot circuit, said first and second single shot circuits being triggered in response to said two pulse signal outputs of said toggle flip-flop, respectively.

5. Apparatus in accordance with claim 4 including a logic circuit, said logic circuit causing said toggle flip-flop to skip an input pulse when said logic circuit detects an improper synchronization of data and clock pulses being recovered.

6. Apparatus in accordance with claim 5 wherein said logic circuit detects an improper synchronization by failing to detect a synchronization signal comprised of a predetermined number of zero data bits and a predetermined number of clock pulses.

7. Apparatus in accordance with claim 1 including means for delaying said composite signal applied to said first and second gating means.

* * * * *